(12) United States Patent
Fernandez Hernandez

(10) Patent No.: US 11,385,355 B2
(45) Date of Patent: Jul. 12, 2022

(54) METHOD AND SYSTEM FOR RADIONAVIGATION AUTHENTICATION

(71) Applicant: THE EUROPEAN UNION, REPRESENTED BY THE EUROPEAN COMMISSION, Brussels (BE)

(72) Inventor: Ignacio Fernandez Hernandez, Watermael-Boitsfort (BE)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 436 days.

(21) Appl. No.: 16/477,171

(22) PCT Filed: Jan. 15, 2018

(86) PCT No.: PCT/IB2018/050242
§ 371 (c)(1),
(2) Date: Jul. 10, 2019

(87) PCT Pub. No.: WO2018/131002
PCT Pub. Date: Jul. 19, 2018

(65) Prior Publication Data
US 2019/0369262 A1 Dec. 5, 2019

(30) Foreign Application Priority Data
Jan. 11, 2017 (EP) .................................. 17150943

(51) Int. Cl.
*G01S 19/21* (2010.01)
*G01S 19/39* (2010.01)
*H04L 9/32* (2006.01)

(52) U.S. Cl.
CPC ............ *G01S 19/215* (2013.01); *G01S 19/39* (2013.01); *H04L 9/3242* (2013.01)

(58) Field of Classification Search
CPC ....... G01S 19/215; G01S 19/39; G01S 9/3242
See application file for complete search history.

(56) References Cited

U.S. PATENT DOCUMENTS

| 2016/0146947 A1* | 5/2016 | Davies .................... G01S 19/32 342/357.46 |
| 2016/0154106 A1* | 6/2016 | Fernandez-Hernandez ................. G01S 19/215 342/357.42 |
| 2017/0031028 A1* | 2/2017 | Fernandez Hernandez ................. H04L 9/3242 |

FOREIGN PATENT DOCUMENTS

| EP | 2 682 785 A1 | 1/2014 |
| WO | WO 2009/122165 A1 | 10/2009 |
| WO | WO 2015/154981 A1 | 10/2015 |

OTHER PUBLICATIONS

Fernández Hernández, Ignacio et al., "Design Drivers, Solutions and Robustness Assessment of Navigation Message Authentication for the Galileo Open Service", Proceedings of the 27th International Technical Meeting of the Satellite Division of the Institute of Navigation (ION GNSS+ 2014) Tampa, Florida, Sep. 2014, pp. 2810-2827.

(Continued)

*Primary Examiner* — Vladimir Magloire
*Assistant Examiner* — Artem Melkunov
(74) *Attorney, Agent, or Firm* — Lewis Roca Rothgerber Christie LLP

(57) ABSTRACT

A method carried out in a radionavigation system (2), the radionavigation system (2) comprising a receiver (4) and a radionavigation infrastructure (6), the radionavigation infra- (Continued)

structure comprising a plurality of satellite-borne transmitters (8, 8', 8", 8'"), and encryption component (10) configured for communication with the transmitters (8, 8', 8", 8'") and the receiver (4). The method comprises the following, for one or more given transmitters (8) of the plurality of satellite-borne transmitters (8, 8', 8", 8'"). In the radionavigation infrastructure (6), a series of keys $k_{2,i}$ are generated in respect of a predetermined authentication interval [0,T] of duration T and commencing at t=0 and a spreading code-encrypted signal e(t) is generated from a first radionavigation signal $s_1(t)$ using a keystream $K_1(t)$, the keystream $K_1(t)$ being generated with a secret key $k_1$ of the radionavigation infrastructure (6). The method further comprises generating, in the encryption component (10) of the radionavigation infrastructure, a re-encrypted sequence $R_i$ using a keystream $K_{2,i}$ generated with the series of keys $k_{2,i}$. The method further comprises the encryption component (10) transmitting, prior to t=0, the re-encrypted sequence $R_i$ to the receiver (4). The method further comprises transmitting, from the given transmitter (8), the spreading code-encrypted signal e(t) and transmitting, from one of the plurality of transmitters (8, 8', 8", 8'"), the series of keys $k_{2,i}$. The method further comprises, at the receiver (4), (i) receiving and storing, prior to t=0, the re-encrypted sequence $R_i$; (ii) receiving the spreading code-encrypted signal e(t); (iii) receiving the series of keys $k_{2,i}$; (iv) decrypting the re-encrypted sequence $R_i$, using the series of keys $k_{2,i}$ to obtain encrypted sequences $E_i$. The method further comprises, correlating, at the receiver (4), at least portions of the received spreading code-encrypted signal e(t) with the encrypted sequences $E_i$ and thereby generating a code phase measurement for the given transmitter (8). The method may further comprise extracting, at the component (10), from the spreading code-encrypted signal e(t), a plurality of encrypted sequences $E_i$ associated with respective periods of time within the predetermined authentication interval [0,T], wherein the re-encrypted sequence $R'_i$ is generated from the extracted encrypted sequences $E_i$ using the keystream $K_{2,i}$, the re-encrypted sequence $R_i$ being associated with the given transmitter (8). In an embodiment, the encryption component (10) at which the re-encrypted sequence $R_i$ is generated is a ground-based server. Methods carried out in the infrastructure (6) and at the receiver (4), and a radionavigation system (2), infrastructure (6) and receiver (4) are also disclosed.

15 Claims, 2 Drawing Sheets

(56) References Cited

OTHER PUBLICATIONS

Curran, James T. et al.; "Securing GNSS: An End-to-End Feasibility Study for the Galileo Open Service"; Proceedings of the 27th International Technical Meeting of the ION Satellite Division, ION GNSS+ 2014; Tampa, FL; Sep. 8-12, 2014; 2828-2842 pp.
Lo, Sherman et al.; "Signal Authentication—A Secure Civil GNSS for Today"; Inside GNSS magazine, Sep./Oct. 2009, pp. 30-39.
Pozzobon, Oscar et al.; "Anti-spoofing and open GNSS signal authentication with signal authentication sequences"; NAVITEC; 2010; 6pp.
Schielin, Emmanuel et al.; "On the Foundation of GNSS Authentication Mechanisms"; 25th International Technical Meeting of the Satellite Division of the Institute of Navigation; Nashville, TN; Sep. 17-21, 2012; 1194-1207 pp.
Wullems, Chris, et al.; "Signal Authentication and Integrity Schemes for Next Generation Global Navigation Satellite Systems"; Proceedings of the European Navigation Conference; GNSS; 2005; Munich, Germany; 10pp.
Written Opinion for International Application No. PCT/IB2018/050242, dated May 8, 2018, 7pp.
International Search Report for International Application No. PCT/IB2018/050242, dated May 8, 2018, 4pp.
Office Action for corresponding Indian Patent Application No. 201947029717, dated Dec. 31, 2021 (7 sheets).

* cited by examiner

METHOD AND SYSTEM FOR RADIONAVIGATION AUTHENTICATION

CROSS-REFERENCE TO RELATED APPLICATION(S)

This application is a National Phase Patent Application of International Patent Application Number PCT/IB2018/050242, filed on Jan. 15, 2018, which claims priority of European Patent Application No. 17150943.3, filed Jan. 11, 2017. The entire contents of both of which are incorporated herein by reference.

TECHNICAL FIELD

This invention relates to the field of the authentication of radionavigation signals, and in particular to authentication based on range measurements generated from encrypted spreading codes.

BACKGROUND

GNSS signals generally use DSSS (Direct-Sequence Spread Spectrum) techniques whereby the spectrum of the signals is spread through spreading codes. To acquire the signals, a receiver must correlate the spreading code with a replica in order to estimate the signal time of arrival and demodulate the bits modulated on it. These bits provide among others, the satellite position and clock information required to calculate the receiver position.

In order to protect GNSS against spoofing attacks, authentication through cryptographic features can be added to GNSS signals. GNSS authentication features can be added to the data, the spreading codes, or both.

Adding cryptographic information to the GNSS data can ensure the authenticity of the data transmitted by the satellite. It can be based on transmitting a digital signature of the navigation data (e.g. RSA, DSA, or ECDSA), which the receiver can verify with a public key. It can also be based on time-delayed asymmetry, whereby a MAC (message authentication code) authenticating the data is transmitted, and the secret key used to compute this MAC is released some seconds later, so that receivers can verify the authenticity of the data through the MAC, once the key is disclosed. The TESLA (Timed Efficient Stream Loss-tolerant Authentication) protocol is specifically designed for this time-delayed authentication.

While, in general, encryption does not guarantee authentication, spreading code authentication can be obtained through encryption. For that, the spreading code can be multiplied with a bit stream generated with a secret key by a cypher. Then, only a receiver equipped with the secret key would be able to obtain the processing gain from the spreading code correlation, and acquire the signal. As the spreading code is a repeatable sequence, a signal encrypted with a wrong key would never be processed, or would easily be detected as false.

Some GNSS signals have spreading code encryption capabilities, as for example the GPS M-code or the Galileo Commercial Service. The main drawback of GNSS authentication through spreading code encryption is that the receiver needs to incorporate a security module including anti-tampering measures to store the secret key, which, if compromised in one receiver, it may compromise the security of the whole system.

A way to avoid this security module is to perform client-server authentication, where either the server transmits an encrypted sequence to the receiver for the receiver to correlate with the signal, or the receiver transmits the signal samples to the server, for the server to perform the correlation. None of these approaches require the receiver to store and protect the secret key. They generally require, however, that the server does store and protect the secret key.

Wullems, C., et al., "Signal Authentication and Integrity Schemes for Next Generation Global Navigation Satellite Systems", proposes data and signal authentication schemes for GNSS, and in particular for navigation message authentication (NMA). It proposes NMA schemes based on the TESLA protocol, but it does not mention if and how they can be combined with spreading code authentication.

WO2015154981, "Method And System To Optimise The Authentication Of Radionavigation Signals" proposes a TESLA protocol-based approach whereby all satellites transmit the TESLA same key, or a TESLA key from the same key chain. However, it does not mention how to use this key to provide spreading code encryption.

O. Pozzobon et al., "Anti-spoofing and open GNSS signal authentication with signal authentication sequences", NAVITEC 2010, proposes a method by which "signal authentication sequences" are provided to a receiver from a server, whereby these sequences contain parts of the encrypted spreading codes of an encrypted GNSS signal, so that the receiver can correlate some signal samples with the sequences, in order to detect if the processed signal contains these encrypted sequences and is, therefore, authentic. The architecture to implement this method avoids the need for a secret key in the receiver, but it requires a communication channel between the user and the reference receiver in order to transmit the sequences to perform the authentication.

Lo, S et al., "Signal Authentication—A Secure Civil GNSS for Today", InsideGNSS magazine, October 2009, proposes a method by which the hidden attributes of the GPS signals (i.e. the military encrypted codes) are compared between a reference receiver under control and user device to be authenticated, in order to detect if these hidden attributes are found in both signals. The architecture to implement this method does not require the user receiver or server to store any secret key, but it requires a communication channel between the user and the reference receiver to perform the authentication. While this method provides a significant advantage over the state-of-the-art at the time, the server needs to observe with a good visibility the signals observed by the receivers to authenticate in a given service area, and there is an inherent gain loss in the correlation process, as the code replica is subject to noise too.

Technical Problem

The architectures proposed in the state-of-the-art require that, for each authentication, the server and the receiver are linked through a communication channel, and the server generally stores and protect a private key. Therefore, they are not implementable for a standalone, autonomous receiver without a security module. They are not implementable either in a server not having the secret key, except in case the signals at the server and receiver are correlated, which also has some disadvantages.

An object of the present invention is to provide a radionavigation system that allows a receiver to work in stand-alone mode for long time periods, i.e. without a ground assistance channel, while being able to authenticate a signal based on symmetrically encrypted spreading-codes but without having to store a secret key.

SUMMARY

The aforementioned technical problem is solved by the methods of claims 1, 8, 9, 13, 14 and 15, by the radionavigation system of claim 10, the radionavigation infrastructure of claim 11 and by the receiver of claim 12.

According to one aspect of the invention there is provided a method carried out in a radionavigation system, the radionavigation system comprising a receiver and a radionavigation infrastructure, the radionavigation infrastructure comprising a plurality of satellite-borne transmitters, and encryption component configured for communication with the transmitters and the receiver, the method comprising, for one or more given transmitters of the plurality of satellite-borne transmitters: generating, in the radionavigation infrastructure, a series of keys $k_{2,i}$ in respect of a predetermined authentication interval [0,T] of duration T and commencing at t=0; generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure; generating, in the encryption component of the radionavigation infrastructure, a re-encrypted sequence $R_i$ using a keystream $K_{2,i}$ generated with the series of keys $k_{2,i}$; transmitting, prior to t=0, by the encryption component to the receiver, the re-encrypted sequence $R_i$ to the receiver; transmitting, from the given transmitter, the spreading code-encrypted signal e(t); transmitting, from one of the plurality of transmitters, the series of keys $k_{2,i}$; receiving and storing, at the receiver, prior to t=0, the re-encrypted sequence $R_i$; receiving, at the receiver, the spreading code-encrypted signal e(t); receiving, at the receiver, the series of keys $k_{2,i}$; decrypting, at the receiver, the re-encrypted sequence $R_i$ using the series of keys $k_{2,i}$ to obtain encrypted sequences $E_i$; and correlating, at the receiver, at least portions of the received the spreading code-encrypted signal e(t) with the encrypted sequences $E_i$ and thereby generating a code phase measurement for the given transmitter.

Thus, at least in embodiments, the invention involves the following steps:
- Generation, with a key $k_1$, of an encrypted spreading code sequence e(t), that will be later transmitted by a satellite.
- Generation of a chain of keys $k_{2,i}$, that will also be transmitted by a satellite.
- Generation of re-encrypted sequences $R_i$, by encrypting said encrypted sequence e(t), with $k_{2,i}$.
- Transmission of several re-encrypted sequences from a server to a receiver, covering the period over which the receiver will authenticate the signal.
- Authentication of the satellite signal at the receiver by storing the e(t) when transmitted from the satellite, and correlating with the sequence generated by decrypting $R_i$ with, $k_{2,i}$ once received.

In one embodiment, the method further comprises extracting, at the component, from the spreading code-encrypted signal e(t), a plurality of encrypted sequences $E_i$ associated with respective periods of time within the predetermined authentication interval [0, T]. Preferably, the re-encrypted sequence $R'_i$ is generated from the extracted encrypted sequences $E_i$ using the keystream $K_{2,i}$, the re-encrypted sequence $R'_i$ being associated with the given transmitter.

In another embodiment, generating the re-encrypted sequence $R_i$ comprises generating a single re-encrypted sequence $R'_i = K_{1,i}$; $K_{2,i}$, where $K_{1,i}$ corresponds to the keystream generated from $k_1$ at $[\tau i, \tau i + \Delta]$. Preferably, decrypting, at the receiver, the re-encrypted sequence $R_i$ comprises obtaining encrypted sequences $E_i$ from $$E_i = R'_i C_1 K_{2,Ii},$$

where $C_1$ is the spreading code of the first radionavigation signal $s_1(t)$ from the given transmitter, which is known to the receiver.

In one embodiment, the encryption component at which the re-encrypted sequence $R_i$ is generated comprises a ground-based server.

In another embodiment, the method further comprises: receiving authenticated satellite ephemeris and clock data embodying, for each of the transmitters, position and clock data thereof; calculating a first receiver PVT solution from the position and clock data; computing a second receiver PVT solution based on one or more of the code phase measurements; comparing the first receiver PVT solution with the second receiver PVT solution and determining that the first receiver PVT solution is authenticated if the first receiver PVT solution differs from the second receiver PVT solution by less than a predetermined tolerance.

According to another aspect of the invention there is provided a method carried out in a radionavigation infrastructure of a radionavigation system, the radionavigation system further comprising a receiver, the radionavigation infrastructure comprising a plurality of satellite-borne transmitters and an encryption component configured for communication with the transmitters and the receiver. The method comprises the following, for one or more given transmitters of the plurality of satellite-borne transmitters: generating, in the radionavigation infrastructure, a series of keys $k_{2,i}$ in respect of a predetermined authentication interval [0, T] of duration T and commencing at t=0; generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure; generating, in the encryption component of the radionavigation infrastructure, a re-encrypted sequence $R_i$ using a keystream $K_{2,i}$ generated with the series of keys $k_{2,i}$; transmitting, prior to t=0, by the encryption component to the receiver, the re-encrypted sequence $R_i$ to the receiver; and transmitting, from the given transmitter, the spreading code-encrypted signal e(t); transmitting, from one of the plurality of transmitters, the series of keys $k_{2,i}$; and wherein the receiver is configured for receiving and storing, at the receiver, prior to t=0, the re-encrypted sequence $R_i$; receiving, at the receiver, the spreading code-encrypted signal e(t); receiving, at the receiver, the series of keys $k_{2,i}$; decrypting, at the receiver, the re-encrypted sequence $R_i$ using the series of keys $k_{2,i}$ to obtain encrypted sequences $E_i$; and correlating, at the receiver, at least portions of the received the spreading code-encrypted signal e(t) with the encrypted sequences $E_i$ and thereby generating a code phase measurement for the given transmitter.

According to another aspect of the invention there is provided a method carried out in a receiver of a radionavigation system, the radionavigation system comprising the receiver and a radionavigation infrastructure, the radionavigation infrastructure comprising a plurality of satellite-borne transmitters, and encryption component configured for communication with the transmitters and the receiver. The method is carried out in respect of one or more given transmitters of the plurality of satellite-borne transmitters. The radionavigation infrastructure is configured for generating a series of keys $k_{2,i}$ in respect of a predetermined authentication interval [0, T] of duration T and commencing at t=0; and generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure. The encryption component of the radionavigation infrastructure is configured for generating a re-encrypted sequence $R_i$ using a keystream $K_{2,i}$ generated with the series of keys $k_{2,i}$; and transmitting, prior to t=0, the re-encrypted sequence $R_i$ to the receiver. The given transmitter is configured for transmitting the spreading code-encrypted signal e(t). One of the plurality of transmitters is configured for transmitting the series of keys $k_{2,i}$. The method comprises, at the receiver: receiving and storing, prior to t=0, the re-encrypted sequence $R_i$; receiving the spreading code-encrypted signal e(t); receiving the series of keys $k_{2,i}$; decrypting the re-encrypted sequence $R_i$ using the series of keys $k_{2,i}$ to obtain encrypted sequences $E_i$; and correlating at least portions of the received the spreading code-encrypted signal e(t) with the encrypted sequences $E_i$ and thereby generating a code phase measurement for the given transmitter.

According to another aspect of the invention there is provided a radionavigation system configured to perform the method of any of claims 1 to 7 of the appended claims, or according to any of the particular embodiments, implementations or variants set out herein.

According to another aspect of the invention there is provided a radionavigation infrastructure configured to perform the method of claim 8, or according to any of the particular embodiments, implementations or variants set out herein.

According to another aspect of the invention there is provided a receiver configured to perform the method of claim 9, or according to any of the particular embodiments, implementations or variants set out herein.

According to another aspect of the invention there is provided a method carried out in a radionavigation system, the radionavigation system comprising a receiver and a radionavigation infrastructure, the radionavigation infrastructure comprising a plurality of satellite-borne transmitters and a server configured for communication with the transmitters and the receiver. The method comprises the followings, for one or more given transmitters of the plurality of satellite-borne transmitters: generating, in the radionavigation infrastructure, a series of keys $k_2$, in respect of a predetermined authentication interval [0, T] of duration T and commencing at t=0; generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure; providing, at the server, a re-encrypted sequence $R_i$ having been obtained using a keystream $K_{2,i}$ generated with the series of keys $k_{2,i}$; transmitting, from the given transmitter, the spreading code-encrypted signal e(t); transmitting, from one of the plurality of transmitters, the series of keys $k_{2,i}$; and receiving, at the receiver, the spreading code-encrypted signal e(t); sampling, at the receiver, the spreading code-encrypted signal e(t) to obtain a digitalized snapshot S(τi, τi+Δ) of the received spreading code-encrypted signal e(t); transmitting, at the receiver, the digitalized snapshot S(τi, τi+Δ) to the server; transmitting, from one of the plurality of transmitters, the series of keys $k_{2,i}$ to the server; decrypting, at the server, the re-encrypted sequence $R_i$ using the series of keys $k_{2,i}$ to obtain encrypted sequences $E_i$; and at the server, correlating the received digitalized snapshot S(τi, τi+Δ) of the spreading code-encrypted signal e(t) with the encrypted sequences $E_i$ and thereby generating a code phase measurement for the given transmitter.

According to another aspect of the invention there is provided a method carried out in a radionavigation infrastructure of a radionavigation system, the radionavigation system further comprising a receiver, the radionavigation infrastructure comprising a plurality of satellite-borne transmitters and a server configured for communication with the transmitters and the receiver. The method comprises the following, for one or more given transmitters of the plurality of satellite-borne transmitters: generating, in the radionavigation infrastructure, a series of keys $k_{2,i}$ in respect of a predetermined authentication interval [0, T] of duration T and commencing at t=0; generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure; providing, at the server, a re-encrypted sequence $R_i$ having been obtained using a keystream $K_{2,i}$ generated with the series of keys $k_{2,i}$; transmitting, from the given transmitter, the spreading code-encrypted signal e(t); transmitting, from one of the plurality of transmitters, the series of keys $k_{2,i}$ to the server; wherein the receiver is configured for receiving, at the receiver, the spreading code-encrypted signal e(t); sampling, at the receiver, the spreading code-encrypted signal e(t) to obtain a digitalized snapshot S(τi, τi+Δ) of the received spreading code-encrypted signal e(t); transmitting, at the receiver, the digitalized snapshot S(τi, τi+Δ) to the server; and decrypting, at the server, the re-encrypted sequence $R_i$ using the series of keys $k_{2,i}$ to obtain encrypted sequences $E_i$; and the method further comprising, at the server, correlating the received digitalized snapshot S(τi, τi+Δ) of the spreading code-encrypted signal e(t) with the encrypted sequences $E_i$ and thereby generating a code phase measurement for the given transmitter.

According to one aspect of the invention there is provided a method carried out in a receiver of a radionavigation system, the radionavigation system comprising the receiver and a radionavigation infrastructure, the radionavigation infrastructure comprising a plurality of satellite-borne transmitters and a server configured for communication with the transmitters and the receiver. The method comprises the following, for one or more given transmitters of the plurality of satellite-borne transmitters: wherein the radionavigation infrastructure is configured for generating a series of keys $k_{2,i}$ in respect of a predetermined authentication interval [0, T] of duration T and commencing at t=0; generating a spreading code-encrypted signal e(t) from a first radionavigation signal $s_1(t)$ using a keystream $K_1(t)$, the keystream $K_1(t)$ being generated with a secret key $k_1$ of the radionavigation infrastructure; wherein a re-encrypted sequence $R_i$ is providing at the server, the re-encrypted sequence $R_i$ having been obtained using a keystream $K_{2,i}$ generated with the series of keys $k_{2,i}$; wherein the given transmitter is configured for transmitting the spreading code-encrypted signal e(t); wherein one of the plurality of transmitters is configured for transmitting the series of keys $k_{2,i}$ to the server; wherein the method carried out at the receiver comprises receiving, at the receiver, the spreading code-encrypted signal e(t); sampling, at the receiver, the spreading code-encrypted signal e(t) to obtain a digitalized snapshot S(τi, τi+Δ) of the received spreading code-encrypted signal e(t);

transmitting, at the receiver, the digitalized snapshot S(τi, τi+Δ) to the server; and decrypting, at the server, the re-encrypted sequence $R_i$ using the series of keys $k_{2,i}$ to obtain encrypted sequences $E_i$; and wherein the server is configured for correlating the received digitalized snapshot S(τi, τi+Δ) of the spreading code-encrypted signal e(t) with the encrypted sequences $E_i$ and thereby generating a code phase measurement for the given transmitter.

An advantage of the invention (e.g. with respect to known systems that include watermarking techniques in the spreading codes), is that it can be implemented over already existing signals with code encryption capabilities, as e.g. the Galileo Commercial Service E6B/C signals, without modifying its specification, provided that other transmitters transmit the keys $k_{2,i}$. The keys $k_{2,i}$ must be authenticatable by the system.

BRIEF DESCRIPTION OF THE DRAWINGS

Embodiments of the invention will now be described, with reference to the appended drawings, in which.

DETAILED DESCRIPTION OF PREFERRED EMBODIMENTS

Figure 1:
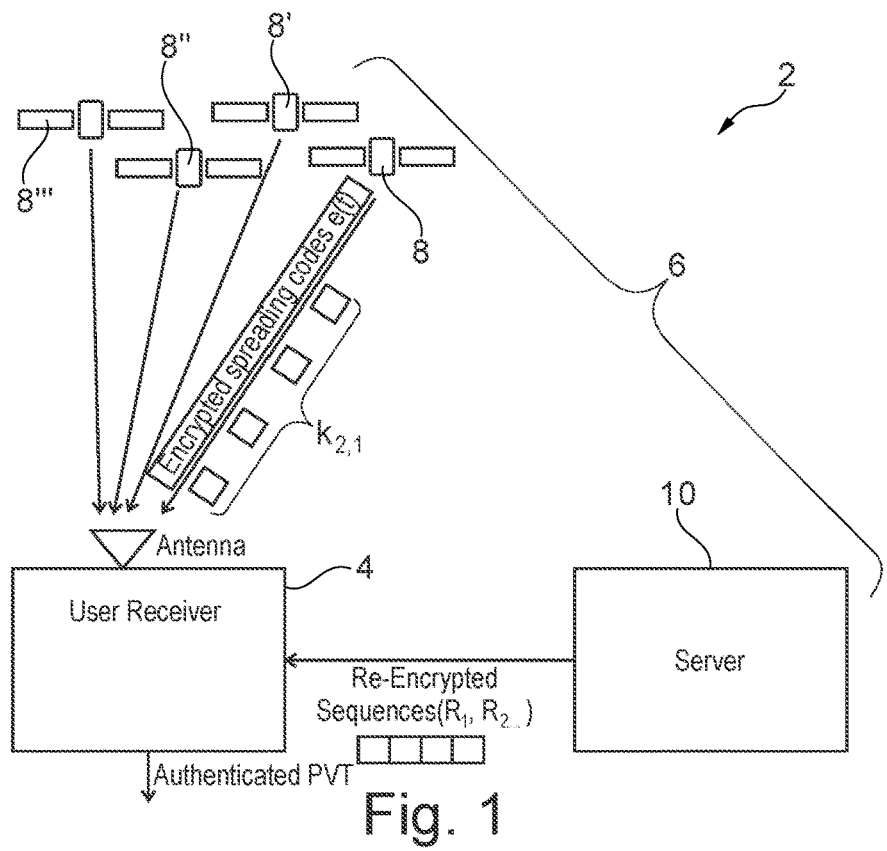
FIG. 1 is a schematic illustration of a radionavigation system according to an embodiment of the invention.

FIG. 1 is a schematic illustration of a radionavigation system 2 according to an embodiment of the invention. The radionavigation system 2 comprises a (user) receiver 4 and radionavigation infrastructure 6, the latter comprising a plurality of satellite-borne transmitters 8 and, in this embodiment, a ground-based server 10. However, it will be appreciated by persons skilled in the art one or more of the functions described herein as being performed by the ground-based server 10 may, as appropriate, be performed at one or more of the transmitters 8 or by another mobile, airborne or near-earth object.

In the illustrated embodiment, the user receiver 4 with an antenna (not shown) receives the re-encrypted sequences ($R_i$) from the server 10 and calculates an authenticated Position, Velocity and Time (PVT) solution based on the received radionavigation signals and the re-encrypted sequences $R_1$, as will be described in further detail hereinafter.

In the following, embodiments of the invention are described with reference to a simplified model—to explain in more detail the concept and its variants, for the sake of illustration. Here, it is assumed that a signal $s_1(t)$ generated by a transmitter 8, e.g. a GNSS satellite, composed by a carrier and a spreading code:

$$s_1(t)=C_1(t)\cos(2\pi f_1 t+\varphi_1)$$

where $C_1(t)$ is a spreading code sequence,
$f_1$ is the carrier frequency, and
$\varphi_1$ is the phase of the signal. It is to be noted that the signal $s_1(t)$ is a simplified representation of real GNSS signals, which are generally modulated by a data stream, a secondary code, or a sub-carrier. It will be appreciated by persons skilled in the art that the techniques according to the invention have applicability to systems using such other signals.

It is assumed that, before it is transmitted by transmitter 8, the signal $s_1(t)$ is encrypted with a keystream $K_1(t)$, generated with a secret key $k_1$. Then, the encrypted signal is $$e(t)=s(t)K_1(t)$$

where is the XOR symbol and implies that each chip is multiplied by one bit of the keystream $K_1(t)$. It is assumed that the spreading code-encrypted signal e(t) is now transmitted by a given radionavigation source (e.g. a satellite) during a time interval [0, T], i.e. having a start at t=0 and a duration T, which can be in the order of hours, days, or longer.

It is assumed that a signal $s_2(t)$ which contains a modulated spreading code $C_2(t)$, and a modulated data stream $D_2(t)$ over a carrier frequency $f_2$, and with a phase $\varphi_2$, as follows:

$$s_2(t)=C_2(t)D_2(t)\cos(2\pi f_2 t+\varphi_2)$$

The data stream $D_2(t)$ includes, among other potential information, a sequence of encryption keys $k_{2,i}$, which are disclosed over time, following for example a TESLA protocol, which is known to persons skilled in the art. The signal $s_2(t)$ can be transmitted from the same source (transmitter 8) as $s_1(t)$ or from a different source (transmitter 8', 8'', 8''', or other mobile/airborne object or ground device). Each $k_{2,i}$ is associated to a given time period i, starting at τi, where τ is the duration of time period between keys. A $k_{2,i}$ used can be a key already used by the GNSS system to provide data authentication, e.g. a TESLA key of a key chain. The keys $k_{2,i}$ where i=[0, 1, . . . , N] covering a time period [0, T] are known by the system (radionavigation infrastructure 6) but not by the users (receivers 4), until they are disclosed.

Before e(t) is transmitted, the system (radionavigation infrastructure 6) already knows the full sequence e(t). In this embodiment, the server 10 of radionavigation infrastructure 6 extracts from e(t) some encrypted sequences $E_i$ associated to periods of times within the interval [0, T], starting at τi and having a duration Δ, $E_i$=e[τi, τi+Δ].

The server 10 also knows the keys $k_{2,i}$ that will be transmitted over the service interval. It can create re-encrypted sequences $R_i$=Ei $K_{2,i}$, where $K_{2,i}$ is a keystream sequence generated with $k_{2,i}$. The $R_i$ sequences are generated by the server 10 at a secured ground infrastructure part of radionavigation infrastructure 6 and transmitted to the receiver 4 covering a long period of time, for example of several hours or days. The receiver 4 stores the sequences (i.e., without the need of a security anti-tampering module). The server 10 is not compromised by disclosing $R_i$, as it will not be until the $k_{2,i}$ are received, that the sequence can be decrypted and correlated with the signal.

In use, the operations in the computation of a position (PVT solution) at the various elements of the radionavigation system 2 are as follows.

At ground infrastructure (server 10) side, the following steps are performed, using the techniques/operations set out hereinabove, in relation to each transmitter.

Generation of the e(t) encrypted sequence based on first radionavigation signal $s_1(t)$.

Generation of a chain or series of keys $k_{2,i}$ for the time interval [0, T].

Generation of the $R_i$ sequences for the same interval.

Transmission, prior to t=0, of the $R_i$ sequences to the receiver 4.

At user receiver 4 side, the following steps are performed, using the techniques/operations set out hereinabove, in relation to each transmitter.

Reception and storage, at a time prior to t=0, of the $R_i$ sequences for the service time period t=[0, T], for one or several transmitters (8 to 8''').

Tracking of an open, standard signal, as Galileo E1 OS, as in a standard receiver, and calculation of a continuous PVT solution based on the open signal.

At each given τi:

Sampling and storage of a digital snapshot S(τi, τi+Δ) of the received encrypted signal e(t).

Reception and authentication of the re-encryption key $k_{2,i}$ incorporated in second radionavigation signal $s_2(t)$.

Decryption of $R_i$ with $K_{2,i}$, in order to generate $E_i$. Assuming the encryption/decryption process is symmetric:

$$E_i = R_i K_{2,i}$$

Correlation of the received e(t) with $E_i$ and generation of the code phase measurement per transmitter.

Reception of the authenticated satellite ephemeris and clock data required to know the position and clock of the satellite-borne transmitters 8 to 8''', which is required for the receiver 4 position calculation.

Computation of a position based on one or several such code phase measurements.

Comparison of the open signal PVT solution with the position calculated by the measurements extracted from the encrypted measurements. If the PVT difference is tolerable according to the statistical error expected from the measurements and corrections, it is considered authenticated.

In the following, various further embodiments or variants are set out: these are implemented as done with the first embodiment, except as described hereinafter.

In a first variant, instead of providing a re-encrypted sequence $R_i$ of an encrypted spreading-code sequence $E_i$ associated to a given transmitter 8, the system (e.g. server 10) transmits a single re-encrypted sequence $R'_i = K_{1,i} K_{2,i}$ to the receiver 4, where $K_{1,i}$ corresponds to the keystream generated from $k_1$ at [τi, τi+Δ]. The main advantage of this approach is that, in case a single key $k_1$ is used for several transmitters 8 to 8''', a single re-encrypted sequence would be used for several transmitters, simplifying the process and reducing the bandwidth required.

In this case, in order to generate the (correlation) sequence, the receiver 4 performs the following:

$$E_i = R'_i C_1 K_{2,i},$$

where $C_1$ is the spreading code of the signal from a given transmitter, which is known to the receiver.

In another implementation, the re-encrypted sequences $R'_i$ are not transmitted from the server 10, but are transmitted in another signal or signal component from another component of radionavigation infrastructure 6. This implementation can increase the autonomy of the receiver 4, which would in such a scenario not require the connection, even if sporadic, to a server 10.

Figure 2:
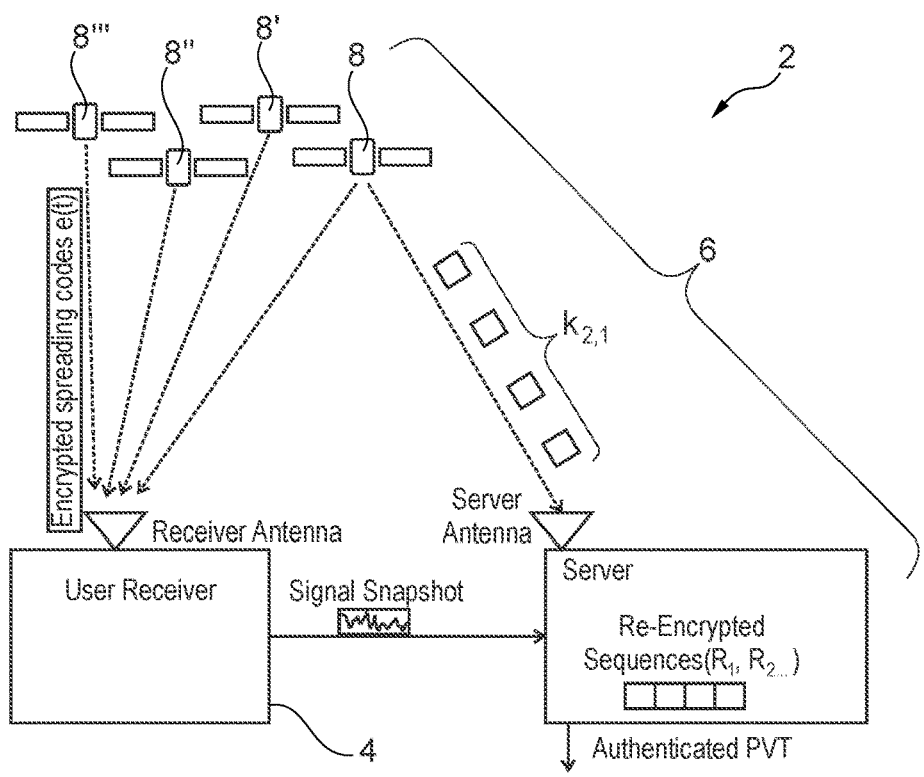
FIG. 2 is a schematic illustration of a radionavigation system according to another embodiment of the invention.

FIG. 2 is a schematic illustration of a radionavigation system according to another embodiment of the invention. In this embodiment, the user receiver 4 sends a snapshot of the encrypted signal e(t) to the server 10, which calculates an authenticated PVT solution based on the received signals e(t) and the re-encrypted sequences $R'_i$, so that even the server 10 does not have to possess the secret key $k_1$.

Figure 3:
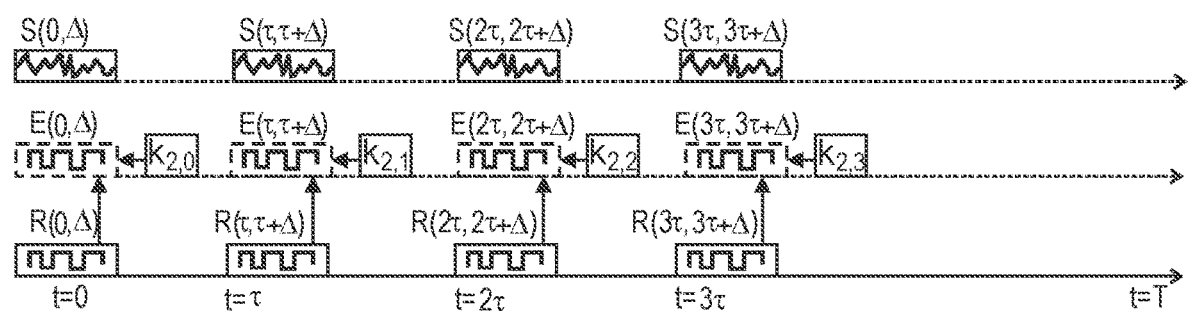
FIG. 3 is a schematic illustration of the sequences and keys in time, including the generation of sequences $E_i$ from $R_i$ sequences and keys $k_{2,i}$, in the embodiment of FIG. 2.

More particularly, receiver 4 receives the encrypted signals e(t) from a fourth transmitter 8''' and samples and derive a snapshot S(τi, τi+Δ) of the digitalised encrypted signals, which it sends to the server 10 through a communication channel. FIG. 3 is a schematic illustration of the sequences and keys in time, including the generation of sequences $E_i$ from $R_i$ sequences and keys $k_{2,i}$, in the embodiment of FIG. 2.

In addition, server 10 receives the series of keys $k_{2,i}$ transmitted by a first transmitter 8. The server 10 possesses the re-encrypted sequences $R'_i$ and, upon reception of the keys $k_{2,i}$, it is able to compute the correlation sequences $E_i$ using $$E_i = R'_i C_1 K_{2,i}.$$

The server 10 can, through the abovementioned correlation and subsequent steps, calculate the authenticated solution of the receiver 4. While this approach involves a receiver-server communication channel for each authentication, its advantage with respect to the known techniques is that it removes the need for the server 10 to possess the secret key $k_1$ in order to authenticate the receiver, lowering the security requirements of the server 10. It also solves the issue with known techniques that they cannot generate a noise-free replica.

Another implementation, based on that of FIG. 3, is one in which the server 10 receives $E_i$ directly from the secure ground infrastructure, so that, while $E_i$ sequences cannot be disclosed, its disclosure affects only their applicability time, as opposed to the disclosure of $k_1$, which would compromise the entire system 2. This would avoid the need of continuously receiving $k_{2,i}$, while requiring a lower level of security as that needed for storing $k_1$.

Another variant is one in which, in addition to the re-encrypted sequences $R_i$, the receiver 4 stores some additional information $D_i$ required for the future correlation, encrypted with the later-disclosed key $k_{2,i}$, and intended to add variability or entropy to the process. This information may relate to the exact synchronisation time of the sequence, so that, instead of re-encrypting the sequence at t=τi, the encrypted sequence starts at t=τi+$\delta_i$, where $\delta_i$ is only known to the receiver 4 once decrypted by $k_{2,i}$. It can also add a salt or nonce, different and required to decrypt for each correlation sequence.

In another variant, the signal sampling period is longer than Δ, in order to allow a synchronisation error between the receiver 4 and the system 6 reference time. In this case the time duration Δ for $R_i$ and $S_i$ are different, so that longer $S_i$ intervals can ensure the probability of correlation, even if the receiver is not synchronised to a common time reference.

In another variant, the receiver 4 uses $k_{2,i}$ to authenticate the navigation data of the transmitter 8, as for example the ephemeris and clock information, so as to allow an authenticated synchronisation of the transmitter 8 and the receiver 4, necessary to perform the signal correlation.

In another variant, the $R_i$ sequences are authenticated from the server 10 through a private key of a public-private key pair and the receiver 4 is in possession of the public key. This public key may be that required to authenticate $k_{2,i}$.

In another variant, the keys $k_{2,i}$ are not received from a transmitted radiofrequency signal but from another source.

In another variant, the $s_2(t)$ and $s_1(t)$ are components of the same carrier, or signals from different carriers from the same source, or signals which may include secondary codes or data modulated with the spreading codes.

The abovementioned techniques can be specifically implemented for the Galileo system, whereby the encrypted signal is the E6B or the E6C signal, and the signal transmitting the re-encryption keys is the E1B I/NAV signal, where the re-encryption keys are part of a navigation message authentication (NMA) service delivered on that signal through a TESLA chain. In this case, the public key used to authenticate the TESLA root key can be that used to authenticate the re-encrypted sequences $R_i$ provided from the server 10.

In another implementation, the receiver 4 does not perform any comparison between a standard, open signal-based PVT, and the spreading-code-encrypted PVT. The receiver 4 just takes the open signal to receive the authenticated navigation data, and uses the measurements form the re-encrypted sequences $R_i$ to calculate the authenticated PVT.

In another implementation, the comparison between the open signal and the encrypted signals is performed at measurement level, as opposed to PVT level, so that if the measurements are considered similar, the open signal-based position is considered authenticated.

The invention claimed is:

1. A method carried out in a radionavigation system, the radionavigation system comprising a receiver and a radionavigation infrastructure, the radionavigation infrastructure comprising a plurality of satellite-borne transmitters, and encryption component configured for communication with the transmitters and the receiver, the method comprising, for one or more given transmitters of the plurality of satellite-borne transmitters:

generating, in the radionavigation infrastructure, a series of keys $k_{2,i}$ in respect of a predetermined authentication interval [0,T] of duration T and commencing at t=0;

generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure;

generating, in the encryption component of the radionavigation infrastructure, a re-encrypted sequence $R_i$ using a keystream $K_{2,i}$ generated with the series of keys $k_{2,i}$;

transmitting, prior to t=0, by the encryption component, the re-encrypted sequence $R_i$ to the receiver;

transmitting, from the given transmitter, the spreading code-encrypted signal e(t);

transmitting, from one of the plurality of transmitters, the series of keys $k_{2,i}$; and receiving and storing, at the receiver, prior to t=0, the re-encrypted sequence $R_i$;

receiving, at the receiver, the spreading code-encrypted signal e(t);

receiving, at the receiver, the series of keys $k_{2,i}$;

decrypting, at the receiver, the re-encrypted sequence $R_i$ using the series of keys $k_{2,i}$ to obtain encrypted sequences $E_i$; and correlating, at the receiver, at least portions of the received the spreading code-encrypted signal e(t) with the encrypted sequences $E_i$ and thereby generating a code phase measurement for the given transmitter.

2. The method of claim 1, further comprising:

extracting, at the encryption component, from the spreading code-encrypted signal e(t), a plurality of encrypted sequences $E_i$ associated with respective periods of time within the predetermined authentication interval [0,T].

3. The method of claim 2, wherein:

the re-encrypted sequence $R'_i$ is generated from the extracted encrypted sequences $E_i$ using the keystream $K_{2,i}$, the re-encrypted sequence $R'_i$ being associated with the given transmitter.

4. The method of claim 1, wherein generating the re-encrypted sequence $R_i$ comprises generating a single re-encrypted sequence $R'_i = K_{1,i} \oplus K_{2,i}$, where $K_{1,i}$ corresponds to the keystream generated from $k_1$ at [τi, τi+Δ].

5. The method of claim 4, wherein decrypting, at the receiver, the re-encrypted sequence $R_i$ comprises obtaining encrypted sequences $E_i$ from $$E_i = R'_i \oplus C_1 \oplus K_{2,ji},$$

where $C_1$ is the spreading code of the first radionavigation signal $s_1(t)$ from the given transmitter, which is known to the receiver.

6. The method of claim 1, wherein the encryption component at which the re-encrypted sequence $R_i$ is generated is a ground-based server.

7. The method of claim 1, further comprising:

receiving authenticated satellite ephemeris and clock data embodying, for each of the transmitters, position and clock data thereof;

calculating a first receiver PVT solution from the position and clock data;

computing a second receiver PVT solution based on one or more of the code phase measurements;

comparing the first receiver PVT solution with the second receiver PVT solution and determining that the first receiver PVT solution is authenticated if the first receiver PVT solution differs from the second receiver PVT solution by less than a predetermined tolerance.

8. A method carried out in a radionavigation infrastructure of a radionavigation system, the radionavigation system further comprising a receiver, the radionavigation infrastructure comprising a plurality of satellite-borne transmitters and an encryption component configured for communication with the transmitters and the receiver, the method comprising, for one or more given transmitters of the plurality of satellite-borne transmitters:

generating, in the radionavigation infrastructure, a series of keys $k_{2,i}$ in respect of a predetermined authentication interval [0,T] of duration T and commencing at t=0;

generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure;

generating, in the encryption component of the radionavigation infrastructure, a re-encrypted sequence $R_i$ using a keystream $K_{2,i}$ generated with the series of keys $k_{2,i}$;

transmitting, prior to t=0, by the encryption component, the re-encrypted sequence $R_i$ to the receiver; and transmitting, from the given transmitter, the spreading code-encrypted signal e(t);

transmitting, from one of the plurality of transmitters, the series of keys $k_{2,i}$.

9. A method carried out in a receiver of a radionavigation system, the radionavigation system comprising the receiver and a radionavigation infrastructure, the radionavigation infrastructure comprising a plurality of satellite-borne transmitters, and encryption component configured for communication with the transmitters and the receiver, wherein the radionavigation infrastructure is configured for generating a series of keys $k_{2,i}$ in respect of a predetermined authentication interval [0,T] of duration T and commencing at t=0, and for generating a spreading code-encrypted signal e(t) from a first radionavigation signal $s_1(t)$ using a keystream $K_1(t)$, the keystream $K_1(t)$ being generated with a secret key $k_1$ of the radionavigation infrastructure, and wherein the encryption component of the radionavigation infrastructure is configured for generating a re-encrypted sequence $R_i$ using a keystream $K_{2,i}$ generated with the series of keys $k_{2,i}$, and for transmitting, prior to t=0, the re-encrypted sequence $R_i$ to the receiver, and wherein the given transmitter is configured for transmitting the spreading code-encrypted signal e(t), and wherein one of the plurality of transmitters is configured for transmitting the series of keys $k_{2,i}$, the method comprising:

receiving and storing, prior to t=0, the re-encrypted sequence $R_i$;

receiving the spreading code-encrypted signal e(t);

receiving the series of keys $k_{2,i}$;

decrypting the re-encrypted sequence $R_i$ using the series of keys $k_{2,i}$ to obtain encrypted sequences $E_i$; and correlating at least portions of the received the spreading code-encrypted signal e(t) with the encrypted sequences $E_i$ and thereby generating a code phase measurement for the given transmitter.

10. A radionavigation system configured to perform the method of claim 1.

11. A radionavigation infrastructure configured to perform the method of claim 8.

12. A receiver configured to perform the method of claim 9.

13. A method carried out in a radionavigation system, the radionavigation system comprising a receiver and a radionavigation infrastructure, the radionavigation infrastructure comprising a plurality of satellite-borne transmitters and a server configured for communication with the transmitters and the receiver, the method comprising, for one or more given transmitters of the plurality of satellite-borne transmitters:

generating, in the radionavigation infrastructure, a series of keys $k_{2,i}$ in respect of a predetermined authentication interval [0,T] of duration T and commencing at t=0;

generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure;

providing, at the server, a re-encrypted sequence $R_i$ having been obtained using a keystream $K_{2,i}$ generated with the series of keys $k_{2,i}$;

transmitting, from the given transmitter, the spreading code-encrypted signal e(t);

transmitting, from one of the plurality of transmitters, the series of keys $k_{2,i}$; and receiving, at the receiver, the spreading code-encrypted signal e(t);

sampling, at the receiver, the spreading code-encrypted signal e(t) to obtain a digitalized snapshot $S(\tau i, \tau i+\Delta)$ of the received spreading code-encrypted signal e(t);

transmitting, at the receiver, the digitalized snapshot $S(\tau i, \tau i+\Delta)$ to the server;

transmitting, from one of the plurality of transmitters, the series of keys $k_{2,i}$ to the server;

decrypting, at the server, the re-encrypted sequence $R_i$ using the series of keys $k_{2,i}$ to obtain encrypted sequences $E_i$; and at the server, correlating the received digitalized snapshot $S(\tau i, \tau i+\Delta)$ of the spreading code-encrypted signal e(t) with the encrypted sequences $E_i$ and thereby generating a code phase measurement for the given transmitter.

14. A method carried out in a radionavigation infrastructure of a radionavigation system, the radionavigation system further comprising a receiver, the radionavigation infrastructure comprising a plurality of satellite-borne transmitters and a server configured for communication with the transmitters and the receiver, the method comprising, for one or more given transmitters of the plurality of satellite-borne transmitters:

generating, in the radionavigation infrastructure, a series of keys $k_{2,i}$ in respect of a predetermined authentication interval [0,T] of duration T and commencing at t=0;

generating, in the radionavigation infrastructure, a spreading code-encrypted signal e(t) from a first radionavigation signal $s_1(t)$ using a keystream $K_1(t)$, the keystream $K_1(t)$ being generated with a secret key $k_1$ of the radionavigation infrastructure;

providing, at the server, a re-encrypted sequence $R_i$ having been obtained using a keystream $K_{2,i}$ generated with the series of keys $k_{2,i}$;

transmitting, from the given transmitter, the spreading code-encrypted signal e(t) to the receiver;

transmitting, from one of the plurality of transmitters, the series of keys $k_{2,i}$ to the server;

sampling the spreading code-encrypted signal e(t) to obtain a digitalized snapshot $S(\tau i, \tau i+\Delta)$ of the received spreading code-encrypted signal e(t);

receiving at the server from the receiver a digitalized snapshot $S(\tau i, \tau i+\Delta)$ of the spreading code-encrypted signal e(t); and decrypting, at the server, the re-encrypted sequence $R_i$ using the series of keys $k_{2,i}$ to obtain encrypted sequences $E_i$; and the method further comprising, at the server, correlating the received digitalized snapshot $S(\tau i, \tau i+\Delta)$ of the spreading code-encrypted signal e(t) with the encrypted sequences $E_i$ and thereby generating a code phase measurement for the given transmitter.

15. A method carried out in a receiver of a radionavigation system, the radionavigation system comprising the receiver and a radionavigation infrastructure, the radionavigation infrastructure comprising a plurality of satellite-borne transmitters and a server configured for communication with the transmitters and the receiver, wherein the radionavigation infrastructure is configured for generating a series of keys $k_{2,i}$ in respect of a predetermined authentication interval [0,T] of duration T and commencing at t=0 and for generating a spreading code-encrypted signal e(t) from a first radionavigation signal $s_1(t)$ using a keystream $K_1(t)$, the keystream $K_1(t)$ being generated with a secret key $k_1$ of the radionavigation infrastructure, and wherein a re-encrypted sequence $R_i$ is providing at the server, the re-encrypted sequence $R_i$ having been obtained using a keystream $K_{2,i}$ generated with the series of keys $k_{2,i}$, and wherein the given transmitter is configured for transmitting the spreading code-encrypted signal $e(t)$, and wherein one of the plurality of transmitters is configured for transmitting the series of keys $k_{2,i}$ to the server, the method comprising:

receiving the spreading code-encrypted signal $e(t)$;

sampling the spreading code-encrypted signal $e(t)$ to obtain a digitalized snapshot $S(\tau i, \tau i+\Delta)$ of the received spreading code-encrypted signal $e(t)$;

transmitting the digitalized snapshot $S(\tau i, \tau i+\Delta)$ to the server.

\* \* \* \* \*